(12) United States Patent
Geva et al.

(10) Patent No.: US 10,817,522 B1
(45) Date of Patent: *Oct. 27, 2020

(54) PRODUCT INFORMATION INTEGRATION

(71) Applicant: Upstream Commerce Ltd., Tel Aviv (IL)

(72) Inventors: Shai Geva, Tel Aviv (IL); Amos Peleg, Tel Aviv (IL)

(73) Assignee: UPSTREAM COMMERCE LTD., Tel Aviv (IL)

(*) Notice: Subject to any disclaimer, the term of this patent is extended or adjusted under 35 U.S.C. 154(b) by 219 days.

This patent is subject to a terminal disclaimer.

(21) Appl. No.: 16/024,919

(22) Filed: Jul. 2, 2018

Related U.S. Application Data

(63) Continuation of application No. 14/536,705, filed on Nov. 10, 2014, now Pat. No. 10,042,895, which is a (Continued)

(51) Int. Cl.
*G06F 17/00* (2019.01)
*G06F 16/2457* (2019.01)
(Continued)

(52) U.S. Cl.
CPC ........ *G06F 16/24578* (2019.01); *G06F 16/13* (2019.01); *G06F 16/24* (2019.01); *G06Q 30/0629* (2013.01)

(58) Field of Classification Search
CPC .... G06F 16/24578; G06F 16/24; G06F 16/13; G06F 3/06; G06Q 30/0629
See application file for complete search history.

(56) References Cited

U.S. PATENT DOCUMENTS 5,978,811 A * 11/1999 Smiley ................. G06F 16/288
8,275,770 B2 * 9/2012 Bayliss ................. G06F 16/35
707/736

(Continued)

OTHER PUBLICATIONS

Ali Al-Lawati et al., Blocking-Aware Private Record Linkage, Associations for Computing Machinery, IQIS '05, Proceedings of the 2nd International Workshop on Information Quality in Information Systems, pp. 59-68, Jun. 2005.*

(Continued)

*Primary Examiner* — Greta L Robinson

(57) ABSTRACT

A product matching system, comprising a memory configured to store a database of first product records, each record associated with values of one or more first attributes describing a respective product corresponding to the record. In addition, the system includes an input interface configured to receive a second product record associated with values of one or more second attributes describing a given product. A processing unit adapted to compare the values of the second attributes of second product records received through the input interface to the attributes associated with first product records in the database, to link the second attributes of second records determined to match a first record with the matching first database record, and to use the second attributes of the second records determined to match a first record, in comparing the first database record to further product records that are subsequently received through the input interface.

20 Claims, 6 Drawing Sheets

Related U.S. Application Data continuation-in-part of application No. 13/153,426, filed on Jun. 5, 2011, now abandoned.

(60) Provisional application No. 61/470,434, filed on Mar. 31, 2011.

(51) Int. Cl.
*G06Q 30/06* (2012.01)
*G06F 16/13* (2019.01)
*G06F 16/24* (2019.01)

(56) References Cited

U.S. PATENT DOCUMENTS

| | | | |
|---|---|---|---|
| 8,285,721 B2* | 10/2012 | Ruvini | G06F 16/288 |
| | | | 707/740 |
| 2003/0131021 A1* | 7/2003 | Wight | G06Q 30/02 |
| 2008/0313165 A1* | 12/2008 | Wu | G06Q 10/101 |
| 2009/0138320 A1* | 5/2009 | Schmidt | G06Q 10/06 |
| | | | 705/14.4 |
| 2011/0208618 A1* | 8/2011 | Christenson | G06Q 30/02 |
| | | | 705/27.1 |

OTHER PUBLICATIONS

Mikhail Bilenko et al., Adaptive Normalization: Using Online Learning for Record Linkage in Comparison Shopping, Proceedings of the 5th International Conference on Data Mining (ICDM 2005), Houston, USA, Nov. 2005.*

* cited by examiner

Product Entities

| id | type | date | site | id on site | UPC | price | brand | MPN | name | ... |
|---|---|---|---|---|---|---|---|---|---|---|
| p24 | observ | 2011-03-01 | amazon.com | B002MAPRYU | | $40.77 | | | | |
| p87 | observ | 2011-03-02 | amazon.com | B002MAPRYU | | $35.69 | | | | |
| p23 | offer | | amazon.com | B002MAPRYU | | | SanDisk | SDMX18R-004GR-A57 | SanDisk Sansa Clip+ 4 GB MP3 Player (Red) | |
| p25 | aggregate | | | | | | | | | |
| p134 | observ | 2011-03-01 | buy.com | | 2119338320 | 619659000097 | | $39.75 | | |
| p197 | observ | 2011-03-02 | buy.com | | 2119338320 | 619659000097 | | $39.75 | | |
| p133 | offer | | buy.com | | 2119338320 | 619659000097 | SanDisk | SDMX18R-004GR-A57 | SanDisk 4GB Sansa® Clip+ MP3 Player, Red - SDMX18R-004GR-A57 | |
| p135 | aggregate | | | | | | | | | |
| p142 | aggregate | | | | | | | | | |

Associations

| id | sub-id | super-id | match score | match on | user | summary | synthetic | ... |
|---|---|---|---|---|---|---|---|---|
| a1 | p24 | p23 | 1 | id on site | <unrestricted> | | | |
| a2 | p87 | p23 | 1 | id on site | <unrestricted> | | | |
| a3 | p134 | p133 | 1 | id on site | <unrestricted> | | | |
| a4 | p197 | p133 | 1 | id on site | <unrestricted> | | | |
| a5 | p23 | p25 | 1 | initial | <unrestricted> | | | |
| a6 | p133 | p135 | 1 | initial | <unrestricted> | | | |
| a7 | p25 | p142 | 0.99 | brand+MPN | <unrestricted> | 1 | | |
| a8 | p135 | p142 | 0.99 | brand+MPN | <unrestricted> | | | |
| a9 | p87 | p142 | 0.99 | brand+MPN | <unrestricted> | | 1 | |
| ... | | | | | | | | |

FIG. 5A

Term table

| entry id | product id | type | attribute | value |
|---|---|---|---|---|
| ... | p23 | value | id on site | b002mapryu |
| | p23 | value | brand | sandisk |
| | p23 | value | color | red |
| | p23 | id | MPN | sdmx18r004gra57 |
| | p23 | id fragment | MPN | sdmx18r |
| | p23 | id fragment | MPN | 4gr |
| | p23 | text | name | sansa |
| | p23 | text | name | clip+ |

Additional product data

| id | attribute | value |
|---|---|---|
| p24 | category | Electronics > Portable Audio & Video > MP3 Players & Accessories > MP3 Players |
| p24 | category rank | 69 |

FIG. 5B

PRODUCT INFORMATION INTEGRATION

CROSS-REFERENCE TO RELATED APPLICATIONS

This application is a continuation of U.S. patent application Ser. No. 14/536,705, filed Nov. 10, 2014, which is a continuation in part of U.S. patent application Ser. No. 13/153,426, filed Jun. 5, 2011, which claims the benefit of U.S. Provisional Patent Application 61/470,434, filed Mar. 31, 2011, the disclosures of both of which are incorporated herein by reference.

FIELD OF THE INVENTION

The present invention relates generally to data collection and specifically to product matching.

BACKGROUND

Price comparison allows consumers to select a best source to purchase a desired product. Also, price comparison may be used by vendors to set their prices. As different websites may identify a product differently, systems and methods for product matching have been developed.

US Patent Application Publication 2008/0313165 to Wu et al., titled: "Scaleable Model-Based Product Matching", describes a product matching system in which a product authority includes a list of products. An extraction component extracts information on products from websites and compares the information to the product authority to find a matching entry in the product authority.

Not always, however, do websites have sufficient information to allow product matching, resulting in some product descriptions on websites not being matched to their corresponding entry in the product authority.

SUMMARY

Embodiments of the present invention that are described hereinbelow provide a product matching system, comprising a memory configured to store a database of first product records, each record associated with values of one or more first attributes describing a respective product corresponding to the record, an input interface configured to receive a second product record associated with values of one or more second attributes describing a given product; and a processing unit adapted to compare the values of the second attributes of second product records received through the input interface to the attributes associated with first product records in the database, to link the second attributes of second records determined to match a first record with the matching first database record, and to use the second attributes of the second records determined to match a first record, in comparing the first database record to further product records that are subsequently received through the input interface.

Optionally, the processing unit is configured to store the received records in the database separately from matching first product records, without merging them into the respective matching first product records, but with an indication of their match.

Optionally, the processing unit assigns a matching score to determined matches of received second records to first records, according to a confidence that the matching records describe the same product. Optionally, the matching score assigned by the processing unit is a function of the matching score of the records of the attributes linked to the first record, that confirmed the match. Optionally, the processing unit is configured to provide information on a product corresponding to a first product record in the database, using information from the first product record and from product records linked to the first product record with links having a matching score above a user defined level.

Optionally, at least some of the links are marked with restrictions on their use and the processor is adapted to provide a user with information on a product corresponding to a first product record in the database, using information from the first product record and from product records linked to the first product record that are not restricted for use by the user.

Optionally, the processing unit is configured to limit access to portions of product records.

Optionally, the processing unit is configured to determine for received product records an importance score based on a plurality of different measures on the importance of the product in the eyes of customers or vendors.

Optionally, the system includes an output interface configured to display for products in the database a price comparison of the product from a plurality of vendors, along with proprietary information of a specific vendor, which is displayed only to users authorized by the specific vendor and not to other users.

Optionally, the system includes an output interface configured to display for products in the database a price comparison of the product from a plurality of vendors, along with information on the availability of the product to the specific vendor and/or along with at least one measure indicative of the cost of the product to the specific vendor.

Optionally, the system includes an output interface configured to display product comparison information for a plurality of products concurrently. Optionally, the output interface is configured to display for products in the database information on the popularity of the product.

Optionally, the processing units is adapted to search for product records in the database which meet user provided conditions on price and at least one of a profitability measure and a popularity measure.

There is further provided in accordance with an embodiment of the present invention, a method of managing a product database, comprising providing a database of records describing products including a first product record; receiving a second product record, including values of attributes defining a product; comparing the attribute values of the second record to values of attributes of records in the database and determining that the second record matches the first record; storing the second record in the database, linked to the first record; receiving a third product record including attribute values of the product; and comparing, by a processor, the attributes of the third record to the attributes of the first record and the second record, such that a match can be found even if a match to either the first record or the second record would not have been found.

Optionally, the method includes marking the link of the second record to the first record with at least one parameter of the match. Optionally, the method includes storing the third record in the database, linked to the first record. Optionally, the method includes marking the link of the third record to the first record with at least one restriction on usage of the link. Optionally, marking the link with at least one restriction on usage of the link comprises marking with any restrictions associated with the first record, the second record or with the link of the second record to the first record. Optionally, at least one of the first record, the second record and the link of the second record to the first record is associated with an access restriction and wherein storing the third record in the database linked to the first record comprises storing without the access restriction.

There is further provided in accordance with an embodiment of the present invention, a computer software product, comprising a tangible computer-readable medium in which program instructions are stored, which instructions, when read by a computer, cause the computer to:

access a database of first product records, each record associated with values of one or more first attributes describing a respective product corresponding to the record, receive a second product record associated with values of one or more second attributes describing a given product, compare the values of the second attributes of second product records received through the input interface to the attributes associated with first product records in the database, link the second attributes of second records determined to match a first record with the matching first database record, and use the second attributes of the second records determined to match a first record, in comparing the first database record to further product records that are subsequently received through the input interface.

There is further provided in accordance with an embodiment of the present invention, a method of database operation, comprising managing a database of product records including a plurality of records and links between records believed to relate to same or similar products, wherein a plurality of the links are associated with one or more parameters of the usage of the links; and receiving requests for information from the database; determining for a plurality of the links, whether the received request matches the usage parameters of the link; and responding, by a processor, to the received request using the information in the database, wherein records connected by a link whose usage parameters match the received request are assumed in preparing the response to relate to a single product, while records connected by a link whose usage parameters do not match the received request are assumed in preparing the response to relate to different products.

Optionally, the parameters of usage for at least one of the links comprise a restriction on usage of the link, defining whether the request is entitled to use the link.

Optionally, the restriction on usage of the link depends on the time of the request and/or on the entity providing the request. Optionally, a plurality of the product records include proprietary information of a specific vendor and wherein responding to the request comprises providing in the response proprietary information only if the request is received from a user authorized by the specific vendor. Optionally, the parameters of usage for at least one of the links comprise a parameter of the match between the records connected by the link. Optionally, the parameter of the match between the records connected by the link comprises a confidence score of the match. Optionally, the parameter of the match between the records connected by the link comprises an indication of an attribute having different values in the records connected by the link.

There is further provided in accordance with an embodiment of the present invention, a product matching system, comprising a database of product records, each record associated with one or more attributes describing a product corresponding to the record, wherein the database includes links which connect records believed to relate to a same or similar product, the links being associated with one or more parameters; and a processor configured to access product records in the database, considering records combined by a link as relating to a single product if the one or more parameters of the combining link meet a given condition, and considering records combined by a link as relating to two different products if the one or more parameters of the combining link do not meet the given condition.

Optionally, the one or more parameters comprise a confidence that the records combined by the link relate to the same product and wherein the given condition is that the link confidence is above a user desired confidence threshold.

Optionally, the one or more parameters comprise an owner of the link and wherein the given condition is that a user for which the processor is accessing the records is authorized by the owner to use the link. Optionally, the processor is configured to access product records in order to present to the user the information in the database on one or more products. Optionally, the processor is configured to access product records in order to find records meeting user defined conditions on product price and at least one of a profitability measure and a popularity measure.

There is further provided in accordance with an embodiment of the present invention, a method of presenting information on products, comprising receiving, by a processor, a plurality of records with information on respective products; determining, by the processor, records which relate to a same or similar product; managing for the products at least one measure of importance; receiving requests for information; and providing information on products using the at least one measure of importance, responsive to the requests.

Optionally, receiving the records comprises receiving records with prices of products and providing information on products comprises providing price comparison of one or more products.

Optionally, the at least one measure of importance comprises an importance score on a single-dimension scale.

Optionally, the at least one measure of importance comprises at least one measure of popularity of the product and/or a measure of an importance of the product to one or more competitors. Optionally, the at least one measure of importance is based on web statistics. Optionally, the at least one measure of importance is based on web traffic statistics of web pages associated with products. Optionally, providing information comprises providing a list of products meeting a requested relation between price information and importance information.

Optionally, at least some of the received records include a measure indicative of vendor cost of a product represented by the record and providing information comprises providing information on products meeting desired conditions on importance and the measure indicative of vendor cost. Optionally, receiving a plurality of records with information on respective products comprises collecting information on the price of products from a plurality of websites.

Optionally, providing information comprises providing to a user, concurrently, information based on both the collected price information and web traffic statistics of web pages from which the information was collected.

There is further provided in accordance with an embodiment of the present invention, a computer software product, comprising a tangible computer-readable medium in which program instructions are stored, which instructions, when read by a computer, cause the computer to receive a plurality of records with information on respective products, determine records which relate to a same or similar product; manage for the products at least one measure of importance; receive requests for information; and provide information on products using the at least one measure of importance, responsive to the requests.

There is further provided in accordance with an embodiment of the present invention, a method of presenting information on products, comprising receiving, by a processor, a plurality of records with information on respective products; determining, by the processor, records which relate to a same or similar product; receiving for the products proprietary information from a first vendor; receiving requests for information from the first vendor; and providing information on products using the records and the proprietary information, responsive to the requests.

Optionally, receiving the records comprises receiving records with prices of products and providing information on products comprises providing price comparison of one or more products. Optionally, the proprietary information comprises cost margins of products and/or web analytics of a website of the first vendor. Optionally, the method includes receiving requests for information from a second vendor and responding to the requests with information from the plurality of records, without proprietary information from the first vendor. Optionally, the proprietary information comprises inventory information of products.

There is further provided in accordance with an embodiment of the present invention, a method of managing a product database, comprising providing a database of product records comprising values of product attributes, each product record including for a respective product, values for a sub-group of attributes, which is independent of the attributes for which other product records have values, storing in the database links between records found to at least possibly relate to a same product, receiving an input product record by a processor, comparing the received input product record to product records of the database, by the processor, by assigning comparison scores to attributes for which both the compared records have values and calculating a combined comparison score as a function of the attribute comparison scores; and comparing the received input product record to a plurality of linked product records in the database, by the processor, by assigning comparison scores to one or more attributes for which the input product record and a first one of the linked product records have values, but a second one of the linked records does not have a value, and to one or more attributes for which the input product record and the second one of the linked product records have values, but the first one of the linked records does not have a value, and calculating a combined comparison score for the linked product records, as a function of the attribute comparison scores.

Optionally, the method includes storing a link between the input product record and the plurality of linked product records, if the combined comparison score of their comparison is above a predetermined confidence level. Optionally, storing the link comprises storing the link with the respective combined comparison score and/or with at least one restriction on usage of the link.

Optionally, comparing the received input product record to a plurality of linked product records in the database comprises receiving with the input product record an indication of a condition to be met by the links of the linked product records and comparing the input product record to linked product records in the database, which are linked by links having parameters which meet the indicated condition.

Optionally, each link is stored with a respective confidence value and wherein the condition received with the input product record comprises a required minimal confidence, such that comparing the input product record to linked product records in the database is performed only for product records linked by a link having a confidence value equal or above the required minimal confidence.

There is further provided in accordance with an embodiment of the present invention, a product matching system, comprising an input interface configured to receive, from outside the product matching system, product records comprising values of one or more respective attributes, each product record including for a respective product, values for a sub-group of attributes, which is independent of the attributes for which other product records have values; a memory configured to store a database of the product records received by the input interface, and links between product records in the database, wherein linked product records possibly relate to a same product; and a processing unit adapted to compare product records received through the input interface to product records in the database, by comparing values of attributes for which both the compared product records have values, and to store in the memory, links of compared records found in a comparison to relate to a same product with at least a predetermined confidence level.

In some embodiments, the processing unit is further adapted to compare, on the one hand, the values of attributes of a plurality of linked records in the memory, corresponding to a same given product, to the values of attributes of an input product record received by the input interface, on the other hand, thereby determining whether the input product record refers to the given product.

Optionally, the processing unit is configured to store linked records separately in the database. Optionally, the processing unit assigns a matching score to the match of the input product record to the given product, according to a confidence that the input product record describes the given product. Optionally, the matching score assigned by the processing unit is a function of a matching score of the plurality of linked records to which the input record was found to match. Optionally, the processing unit is configured to receive a user defined level and to provide information on a product corresponding to a first product record in the database, using information from the first product record and from product records matching the first product record with a matching score above the received user defined level. Optionally, each of the attributes is assigned a weight and the processing unit calculates, in comparing records, a match score as a sum of the weights of the attributes which have same values.

Optionally, an indication of a match of first and second product records is marked with restrictions on the use of the match to specific users and the processor is adapted to provide a user with information on a product corresponding to a first product record in the database, using information from the first product record and from product records matched to the first product record by a match that is not restricted for use by the user. Optionally, the processing unit is configured to determine for received product records an importance score based on a plurality of different measures on the importance of the product in the eyes of customers or vendors.

Optionally, the system includes an output interface configured to display for products in the database a price comparison of the product from a plurality of vendors, along with proprietary information of a specific vendor, which is displayed only to users authorized by the specific vendor and not to other users and/or along with at least one measure indicative of the cost of the product to the specific vendor.

Optionally, the processing unit is adapted to search for product records in the database which meet user provided conditions on price and at least one of a profitability measure and a popularity measure. Optionally, the processing unit is adapted to match the input product record to first and second linked product records even when a match between the input product record and either the first product record or the second product record would not have been found.

Optionally, the memory is configured to store with the links, respective ownership indications, which indicate for which users the respective link may be taken into consideration.

There is further provided in accordance with an embodiment of the present invention, a computer software product, comprising a tangible non-transitory computer-readable medium in which program instructions are stored, which instructions, when read by a computer, cause the computer to access a database of product records comprising values of one or more respective attributes, each product record including for a respective product, values for a sub-group of attributes, which is independent of the attributes for which other product records have values, and links between records found in a comparison to at least possibly relate to a same product, receiving an input product record; comparing the attribute values of the received input product record to the attribute values of a plurality of linked product records in the database, corresponding to a given product, thereby determining whether the received input product record refers to the given product; and storing a link between the input product record and a plurality of linked product records, for which the comparing of the attribute values found that the records relate to the same product with at least a predetermined confidence level.

The present invention will be more fully understood from the following detailed description of the embodiments thereof, taken together with the drawings in which:

BRIEF DESCRIPTION OF THE DRAWINGS

FIGS. 5A and 5B are together a schematic illustration of a few records of a main table, in accordance with a possible embodiment of the invention.

DETAILED DESCRIPTION OF EMBODIMENTS

Figure 1:
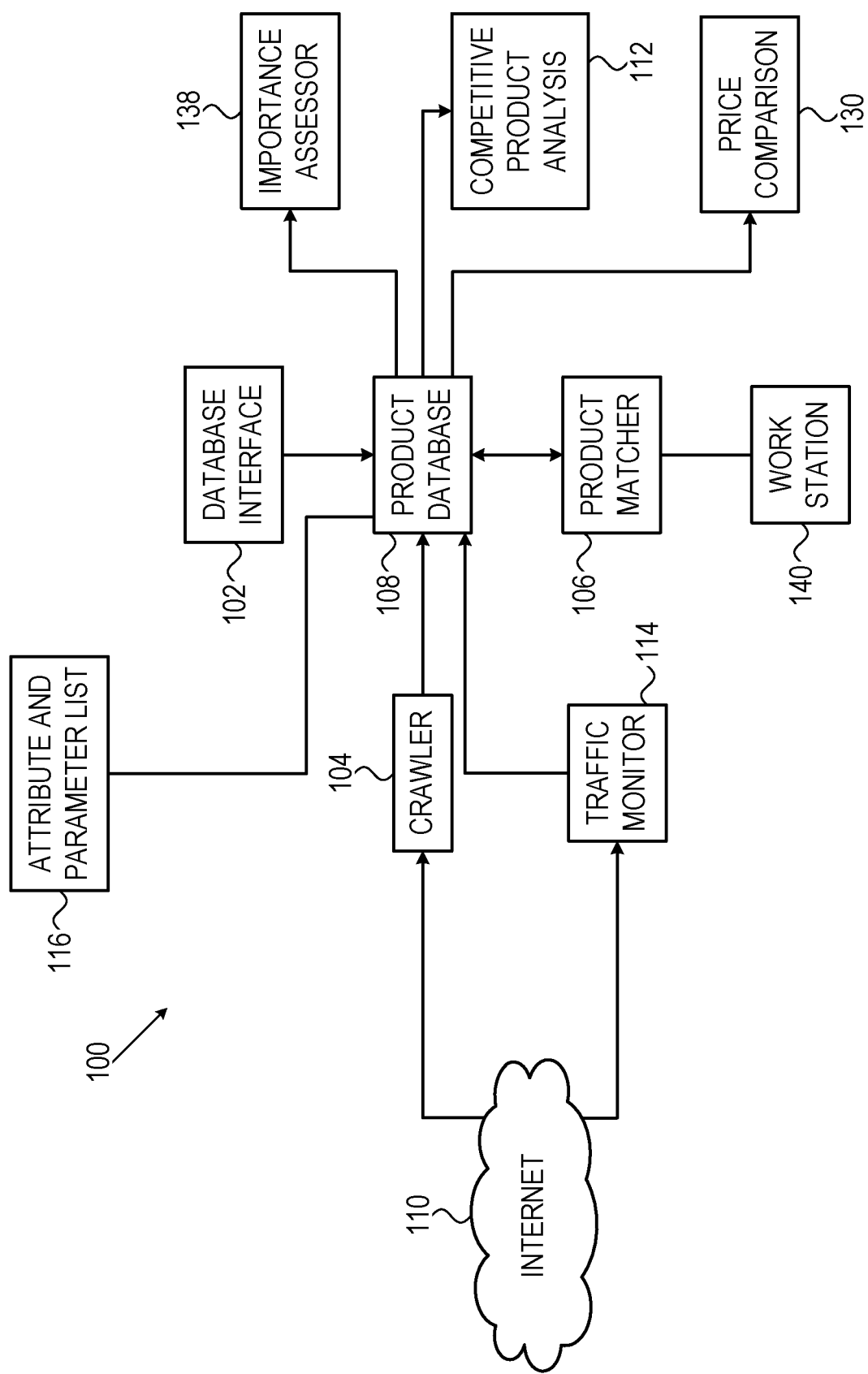
FIG. 1 is a schematic block diagram of a product analysis system, in accordance with an embodiment of the invention.

In some embodiments, a system for competitive product analytics, which collects price information from a plurality of web sites using a web crawler and presents the information to a system user, is provided. The price information provided by the system may be used for various tasks, such as formulation and/or execution of business policies by a vendor, manufacturer or retailer and/or price comparison by a consumer. The system user can use the information, for example, to decide where to buy merchandise or to decide at what price to sell his merchandise.

Using Accumulated Attributes

An aspect of some embodiments of the invention relates to a product matching system adapted to manage a product list along with respective attributes of products in the list. The product matching system compares received product records to the managed list of products to determine one or more records of the list matching the received product record. In the comparison, the system compares the received product records not only to attributes originally included in the product list, but also to attributes of one or more received product records that were earlier determined to match a product list entry. Optionally, the system compares the received product records to products on the product list, using for at least some of the products on the list, attributes collected from a plurality of different sources, such as a plurality of different unrelated web-sites, product catalogs and/or product data feeds. Alternatively or additionally, the system compares the received product records to products on the product list, using for at least some of the products on the list, attributes collected from data sources at different times, optionally times separated by more than a day, more than a week or more than a month. Using the attributes included in received product records increases the number of attributes available for comparison and hence the chances of finding a match. When more matches are achieved, the system can aggregate information on the product from more sources and thus provide a more complete overview of information on the product.

In some embodiments of the invention, received product records are stored separately from the original product records of the product list. The received product records determined to match an original product record are linked to the corresponding record, rather than being merged to form a single record. In comparing a received record to the list, the received record is compared to the attributes of the original record and to attributes of received records linked thereto.

In other embodiments of the invention, for simplicity of managing the database, once a received record is determined to match a specific record of the list, the attributes of the received record are merged into the product record in the list.

The product list may be configured in the matching system before its operation begins, or it may be generated and/or enlarged by collecting received records and/or by incorporating received records into a list. It is noted that in some embodiments an original product list is not used at all and the product list is generated beginning from an empty list by accumulating information from received records.

In some embodiments of the invention, records or specific fields therein may be restricted to use by specific system-users, for example a specific system-user serving as the source of the information, or may otherwise be restricted to use at specific times. In some embodiments of the invention, the extent of the information is restricted based on the user's service level. A low service level may be cheaper and provide the system-user with only basic information (e.g., price comparison), while a higher service level would generally cost more and provide more information, such as shipping data and/or availability data. In some embodiments, a system-user having a low service level is only entitled to use relatively old information, such as 12 hours or 24 hours after added to the system, while system-users of a higher service level are entitled to use the information immediately.

Product Database with Parameterized Links

An aspect of some embodiments of the invention relates to a product matching system which is configured to manage a database of records describing products, to compare records to each other and to link records believed to describe similar or same products. The links are marked with usage parameters which indicate for specific accesses to the database whether the link should be used. Thus, different accesses to the database provide different results according to the conditions of the specific database access, allowing more flexibility in using the product matching system. The database provides differential views of its data according to the details of each specific access.

In some embodiments, the usage parameters include one or more requirements on the access, such as an indication of the users allowed to use the link, restrictions on their use, a usage price and/or times at which the link may be used. Alternatively or additionally, the usage parameters include one or more parameters of the match represented by the link, such as a confidence score of the correctness of the match and/or equivalence assumptions used in determining product similarity. In some embodiments of the invention, the usage parameters include an indication of the source of the link. When accessing records of the database, the system determines which links are used and which are not used according to the specific conditions of the access, such as the identity of the user requesting to access the records, a confidence level requested by the user and/or a desired set of equivalence assumptions for product similarity.

The usage parameters of the links may be generated internally by the system or may be based on information received from an external source, for example with the record.

Limiting Access in Product Matching System

An aspect of some embodiments of the invention relates to a product matching system adapted to manage a product list along with respective attributes of products in the list. For at least some of the attributes and/or at least some of the products on the product list the matching system indicates a parameter indicative of a restriction of the access to the attribute. The restriction parameter optionally includes an indication of the source of the attributes.

Product Matching and Importance

An aspect of some embodiments of the invention relates to a comparative product analysis tool which is configured to manage information on the importance of products to consumers together with comparative product information, such as product price information. Managing information on the importance of products together with comparative information allows a user to receive a more in depth insight on products. In addition, the importance information allows preferential processing and handling of products considered more important, allowing to focus on products that matter, thus supporting better workflow. The importance information is optionally used in selecting and/or sorting the products included in price comparison displays to a system user. For example, in some embodiments, a user may use the product analysis tool to search for products which have specific price characteristics and in addition are expected to have at least a desired sales volume. The user may request to view the importance information along with other information on products, may use the importance information to select which products to view, may view graphical presentations of product data with at least one dimension depending on importance and/or may otherwise use the importance information in the analysis.

In some embodiments of the invention, the importance information includes web-statistics or results based on web statistics. Using web statistics, provides a relatively simple way to determine the popularity of a product, which serves as an important measure for comparative product analysis.

In some embodiments of the invention, the web statistics are collected on a website of a single vendor, e.g., the vendor for which the statistics are collected. Alternatively, web statistics are collected on a plurality of websites, for example based on agreement between a plurality of vendors to share their web statistics and/or based on information from webpage rating services, such as Hitwise and Alexa.

The web-statistics of a product include, for example, the number of visits in web pages describing the product, the number of reviews and/or votes on the product in one or more websites and/or the percentage of web page visits that result in a purchase. In some embodiments of the invention, the web-statistics include time information, such as the average time users spent viewing the web page of the product. Optionally, the web-statistics include information based on the extent of detail viewed by users, for example when viewing additional details requires user action (e.g., enlarging images, viewing sub-pages, opening collapsed windows). For example, the web-statistics may include an average extent of detail on the product viewed by users and/or the number of users viewing for the product additional details.

In some embodiments of the invention, the web statistics are based only on information not appearing on the web pages themselves, such as page hits. Alternatively, the web statistics include also information from the content of the web pages, such as the number of reviews on the web page.

The importance information may optionally include popularity information, such as based on user feedback (e.g., ratings, reviews) provided on one or more web-sites, or based on web traffic. Optionally, text mining methods are used to collect the information. The popularity information may also include data on sales of the product. Alternatively or additionally, the importance information includes one or more indications of the importance assigned to the product by competitors, for example the location assigned to the product in product category listings and/or whether the product is included in promotion activity, such as being listed as a bestseller or featured product. Further importance indicators may include the number and/or percentage of entities, such as vendors, product data feeds and/or comparison shopping websites, dealing in the field of the product, that carry the product. The importance indicators may depend on an estimate of the marketing and/or advertising effort spent by other companies on the product. This may be determined using any method known in the art, including counting the ads relating to the product. In some embodiments of the invention, the importance information may also include an indication provided by a human user.

In some embodiments of the invention, the comparative product analysis tool calculates for products it handles a single dimension measure representative of the importance of the product. In other embodiments, the comparative product analysis tool manages several alternative measures for importance. Optionally, the user may select the weights given to the different indicators used in calculating the importance measure and/or one or more measures to be used from the provided alternative measures. In some embodiments of the invention, the analysis tool dynamically sets the default importance measure and/or the available alternative importance measures according to analysis of the importance parameters most requested by users. For example, if there is an increase in reference to a specific importance parameter, that parameter may be given more weight in importance measures.

The importance information may be used to focus on products that have a globally highest importance score or may be used to determine important products of a specific sub-group, such as of products carried or not carried by a specific vendor. In some embodiments of the invention, a first vendor may request to determine the most important products of a second vendor that are not held by the first vendor. The importance measures used may all be a same global measure which is independent of any specific vendor or may be focused partially or entirely on an estimate of the importance that the second vendor assigns to its products.

Price Analysis with Price Margins

An aspect of some embodiments of the invention relates to a comparative product analysis tool which is configured to integrate proprietary vendor information together with comparative product price information. Integrating proprietary business information with the comparative product information, such as price comparison information may provide better insight into the products and their marketing.

In some embodiments of the invention, the proprietary information comprises cost information indicative of a price margin of the product. Using price margin information with competitive price information allows a better analysis of the profitability of marketing specific products. Alternatively or additionally, the proprietary information includes other cost information, sales performance figures, spending on marketing and/or advertising and/or other proprietary business information.

Optionally, the comparative product analysis tool is configured to limit access to the proprietary information to authorized users. In some embodiments, access is limited also to non-proprietary information, such as product attributes, provided with the proprietary information (e.g., product sales and cost information). In some embodiments of the invention, the comparative product analysis tool uses the non-proprietary information provided with the proprietary information to derive additional information on products, such as to perform matching of product records. The entity providing the proprietary information is allowed to determine the entities authorized to use derived information from non-proprietary information accompanying the proprietary information, such that in some cases, the derived information may be authorized for use by users not allowed to use the proprietary information and possibly even by users not authorized to use the accompanying non-proprietary information.

System Overview

FIG. 1 is a schematic block diagram of a product analysis system 100, in accordance with an embodiment of the invention. Product analysis system 100 optionally manages a product database 108 in which information on various products is stored. In order to keep product database 108 up to date, a web crawler 104 scans through web sites on the Internet 110 and collects information on described products. Product information may also be received through a database interface 102 connecting directly to external product databases and/or other data sources, through the Internet, an intranet or any other suitable network and/or interface. A product matcher 106 reviews received product records and attempts to match them to records in product database 108. Received records for which a match is found are linked to the matching database record for use in further product matching and in data analysis, as described hereinbelow. Optionally, system 100 manages a knowledgebase list 116 of attributes and parameters recognized by the system, for use in normalizing information received by the system.

In some embodiments of the invention, system 100 also receives information from a web traffic monitor 114 adapted to gather web traffic information of product related pages. Web traffic monitor 114 may be a part of system 100, or may be an external unit, possible managed by a separate entity. The gathered traffic information of a web page is optionally stored in product database 108 in a traffic record linked to a corresponding record of the web page product.

In some embodiments of the invention, a competitive product analysis unit 112 uses the product information in product database 108 to produce analytical reports, power interactive analytical applications, alert upon certain conditions, generate recommended actions for optimizing product pricing, assortment and marketing and/or perform other business related tasks. The information in product database 108 may be used for other tasks, for example for price comparison by a price comparison unit 130.

Crawler 104, product matcher 106, importance assessor 138, competitive product analysis unit 112 and price comparison unit 130 may each be implemented on a separate programmable processor. The separate processors may all be located at a single location adjacent product database 108 or one or more of the processors may be located at a remote location and communicate with database 108 through a dedicated or non-dedicated communication network. In some embodiments, one or more of the units of system 100 are implemented partially or entirely by dedicated hardware or firmware, in addition to or instead of software on a programmable processor. Alternatively or additionally, a single programmable processor may host a plurality of software modules which implement two or more of crawler 104, product matcher 106, importance assessor 138, competitive product analysis unit 112 and price comparison unit 130. In embodiments implemented by software on a programmable processor, the software may be downloaded to the computer in electronic form, over a network and/or may be installed from a tangible, computer-readable media, such as optical, magnetic, or electronic memory media, for example. Attribute and parameter list 116 may be stored with product database 108 in a single unit, with product matcher 106 or in a separate storage unit. Each of the components may further be distributed across a number of processors, and the storage units may be distributed as well.

A work station 140 is used by a human controller to configure product matcher 106 and/or to participate in the matching process.

Product Database

Figure 2:
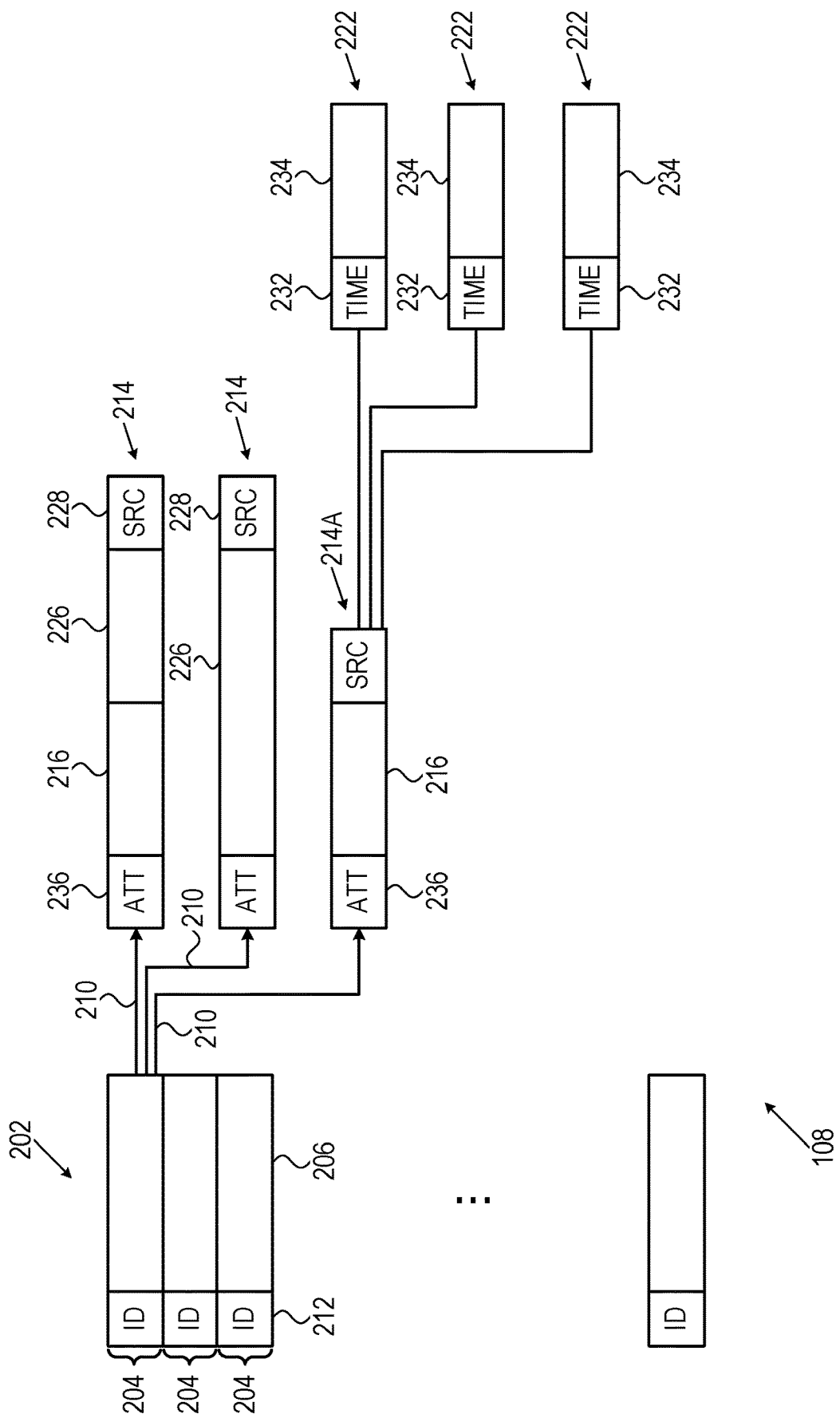
FIG. 2 is a schematic illustration of a conceptual structure of a product database, in accordance with one embodiment of the invention.

FIG. 2 is a schematic illustration of a conceptual structure of product database 108, in accordance with one embodiment of the invention. In the embodiment of FIG. 2, product database 108 comprises a product list 202 including a plurality of aggregate product records 204 identifying products by one or more attribute values stored in respective attribute sections 206 of the aggregate product records 204. Optionally, each record 204 is identified by a unique internal identifier 212.

Database 108 additionally includes product description records 214 which summarize a description of a product from a specific source. Each product description record 214 optionally includes an attribute section 236 which includes attributes describing the product referred to by the record 214 and a business parameter portion 216, which includes parameters of the marketing of the product as appear in the source. Alternatively or additionally to business parameter portion 216, records 214 may include proprietary vendor parameters 226, such as product cost, sales figures, web analytics figures and/or margin information. Each record 214 optionally includes a source field 228 which includes indication of the source (e.g., web address, URL) of the information in the record and/or the time of the extraction of the information.

The business parameters in portion 216, may include, for example, price information (e.g., manufacturer suggested retail price (MSRP), list price, sale price, price after rebate, shopping cart price, reduction and coupon information, shipping costs), product status (e.g., sale/clearance status, condition (used/refurbished/new), warranty period, current and/or projected stock availability, shipping times, description style and user feedback (e.g., reviews, ratings) on the product and/or vendor. In some embodiments, parameter portion 216 includes traffic statistics of the source, for example when the source is a web page, such as number of visits, number of reviews, number of searches for various attributes of the product and/or the internal rating of the web page within its website. In some embodiments of the invention, the traffic statistics include time information, such as the average time users spent viewing the web page of the product. Optionally, the traffic statistics include information based on the extent of detail viewed by users, for example when viewing additional details requires user action (e.g., enlarging images, viewing sub-pages, opening collapsed windows). For example, the traffic statistics may include an average extent of detail on the product viewed by users and/or the number of users viewing for the product additional details.

The statistics are optionally received from traffic monitor 114, and/or from any other suitable source. Further possible business parameters include the product prominence and/or location in product listings of the source, for example based on the location on a web page, the relative font size and the number of times the product is mentioned.

It is noted that in some embodiments, one or more of the business parameters, such as MSRP, may be used also as an attribute for matching product records.

Database 108 includes links 210 which connect records believed to relate to same or similar products. In some embodiments, the links 210 are included in records 204. Alternatively or additionally, the links 210 are included in product description records 214 and/or links 210 are represented by standalone entities. Generally, the links 210 are added by product matcher 106, although links 210 may also be added by a human user and/or product description records 214 may be received through database interface 102 along with an indication of the aggregate product records 204 to which they relate. A single aggregate product record 204 may link to a plurality of product description records 214.

In some embodiments of the invention, links 210 may be associated with one or more parameters of the links, such as the match confidence, the match ownership, match conditions and/or link access restrictions. For example, a link may be marked as belonging to a specific vendor such that only that vendor is allowed to use the link 210. Alternatively or additionally, an indication of who may use the record is included in source field 228 of the record 214.

Optionally, crawler 104 repeatedly generates product records for the same web sites or other sources, periodically, in order to keep product database 106 up to date and/or to allow following trends in web sites. In some embodiments of the invention, each time a record is extracted from the web-site, a separate product description record 214 is generated. For convenience of storage, product records 214 taken from the same web site for the same product may be grouped internally in order to avoid repeated storage of information which does not change between records. In some embodiments of the invention, a main product description record 214A lists information common to all or most of the grouped records and each extraction is assigned a snapshot record 222, listing the time of extraction 232 and a comparison portion 234 listing the additions or changes relative to the main product description record 214A. Generally, the changes are in the business parameters, but changes may also occur in the product attributes, due to changes in the product and/or in the way it is presented to consumers.

Instead of managing different lists for product records 204 and web page records 214, all the records may be included in a single list and the links 210 connect records internally within the list. Product records 204 may be preconfigured before system 100 is employed or may be generated from product description records 214, received by the system, for example when a matching aggregate product record 204 is not found for a received product description record 214. In some embodiments of the invention, links 210 may be used to connect two aggregate product records 204, rather than merging the records, for example when their match is dependent on one or more conditions and/or when the knowledge of the match is restricted only to some system users.

Attributes

The product description attributes in attribute sections 206 may include globally recognized unique identifiers, such as universal product code (UPC), International article number (EAN), global trade item number (GTIN) or International Standard Book Number (ISBN) and/or non-unique identifiers, such as model names or other identifiers, manufacturer, brand, product line, web-site internal identifiers, supplier identifiers and manufacturer identifiers. Optionally, the attributes may also include product images, attributes extracted from images, product types and/or product classifications according to web-site classifications and/or a universal taxonomy, such as UNSPSC (United Nations Standard Products and Services Code). In some embodiments of the invention, the attributes also include product features, such as size, color, shape.

In some embodiments of the invention, to allow for quick attribute comparison by product matcher 106, the attribute section 206 of each product record 204 is updated with copies of the attributes in all the product description records 214 linked to the aggregate product record 204, which are not already included in the product record 204. Optionally, for simplicity, the attributes are stored in attribute section 206 of the product record 204, without stating their source product description record 214. When a match is found, product matcher 106 reviews all the linked product description records 214 to determine the sources of the attributes. Alternatively, each attribute in attribute section 206 of product record 204 is stored along with its source and/or restricted view information. In other embodiments, attribute section 206 of product record 204 does not include copies of the attributes of linked product description records 214, and the comparison to an aggregate product record 204 includes reviewing all the product description product 214 linked to the aggregate product record 204.

Crawler

Crawler 104 optionally operates using methods known in the art to find web pages which describe products of interest. For each such web page, crawler 104 extracts from the web page attributes describing the product and marketing parameters of the product. The attributes and parameters are organized into a product description record 214 which is stored in product database 108. In some embodiments of the invention, crawler 104 may extract information also from web pages providing only product attributes without marketing parameters, in order to collect more information suitable for matching records.

In extracting the information on products, crawler 104 may access a plurality of web pages associated with a single product. Crawler 104 optionally accesses a product web page, for product attributes and parameters. In addition, some information, such as availability of the product, is optionally collected from a shopping cart page accessed from the web page. Optionally, when a single web page describes a plurality of products, crawler 104 visits the page once collecting the current information on all the products described on the page in a single visit. In some embodiments of the invention, crawler 104 also visits for each product, a category or brand page, in which the product is presented as part of a list. From this page, crawler 104 optionally determines a placement of the product within listings and on-page merchandising, which is a significant merchandising cue for assessing product importance within a web site and/or from a provenance.

In some embodiments of the invention, crawler 104 operates entirely automatically without human intervention. Alternatively, some of the tasks of crawler 104 are aided by a human user. For example, crawler 104 may display a web page or a portion thereof to a human operator along with a request to input the parameter and/or attribute values. This option may be used, for example, when crawler 104 does not succeed to collect at least a minimal number of attributes and/or parameters from a web page and/or when the web page is identified as including information which crawler 204 is not able to classify. The crawler may then use the supplied user input in order to extract information from other pages with similar structure. In accessing web pages from which crawler 214 previously collected information, crawler 104 may use previous records 214 generated from the web page, in extracting the information.

In some embodiments of the invention, crawler 104 instructs traffic monitor 114 to collect traffic statistics for the web pages it finds.

Information may also be collected from web search engines, and promotional sites. Additional sources of product information which may be used by system 100 include product feeds from vendors, such as feeds by retail sites to affiliates or comparison shopping engines and database dumps, and product catalogs (online or offline). Feeds may be collected by pull or push protocols, via API calls, or via data files.

Product Matcher

Figure 3:
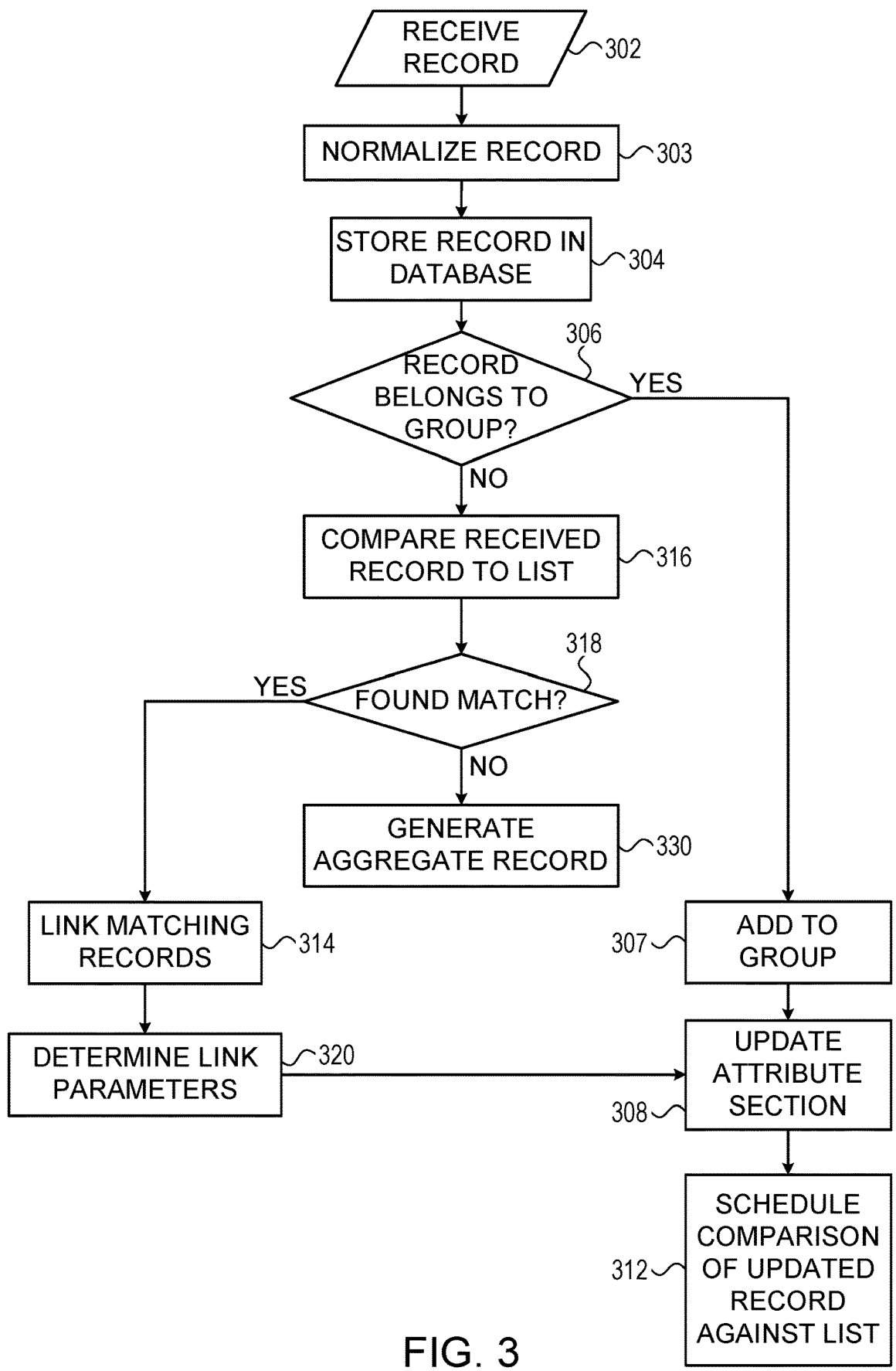
FIG. 3 is a flowchart of acts performed by a product matcher upon receiving a product description record, in accordance with an embodiment of the invention.

FIG. 3 is a flowchart of acts performed by product matcher 106 upon receiving a product description record 214 from crawler 104, in accordance with an embodiment of the invention. Each received (302) description record 214, is optionally normalized (303) into a standard format used by database 108 and is stored (304) in database 108. If (306) the received record 214 belongs to a group of records relating to a same product as another product description record 214, for example it is taken from a same web page at a different time, it is grouped (307) with the other product description record 214. Attributes of the received record 214 not already in the attribute section 206 of the corresponding aggregate product record 204 are added (308) to the attribute section 206.

If (306) the received record 214 does not belong to the same group as another product description record 214, product matcher 106 goes through the product records 204 in client list 202 and compares (316) the attributes of the received web page record 214 to the attributes of the product record 204. If (318) a match is found, the matching product record 204 is linked (314) to the received web page record 214. Usage parameters of the link, are determined (320) and stored with the link. Optionally, in addition, the attribute section 206 of the aggregate product record 204 is updated (308) with the attributes of the received product record 214 linked thereto.

Optionally, once a match is found the search is terminated. Alternatively, in an attempt to find cases in which a plurality of records 204 in client list 202 relate to a single product, the search is continued until all the product records 204 in the list 202 have been compared.

If (318) no match is found, a new aggregate product record 204 is generated (330) for the received record 214.

When an aggregate product record 204 is associated with a larger number of attributes, for example when a new link 210 is found or when a new snapshot record 222 adds additional attributes, the aggregate product record 204 is scheduled (312) for a search for matching records 204 in list 202, to see if the new information can aid in linking additional records.

Record Normalization

The normalization (303) of record 214 optionally includes determining for each parameter and/or attribute having a value in the received record 214, a canonical attribute and/or parameter name in knowledgebase list 116. Optionally, list 116 includes for at least some of the attributes and/or parameters, synonymous names and the normalization (303) includes finding for each received attribute and/or parameter its corresponding canonical form. In addition, for each attribute and/or parameter, list 116 optionally states the possible values of the attribute or parameter. It is noted that in some cases, the parameter and/or attribute names used are all standard and list 116 is used only in identifying parameter and/or attribute values and not their names.

List 116 is optionally created automatically by scanning trustworthy web pages for attributes used in describing products and the values they are assigned. Alternatively or additionally, list 116 is generated manually or semi-automatically, e.g., system 100 provides an operator with attribute values and an interface for classifying the attributes and/or their values. Optionally, list 116 is updated during the operation of system 100 based on records received by crawler 104.

The normalization (303) optionally also includes text standardizing operations, such as changing all letters to lower case, removal of blanks and punctuation and Unicode canonicalization, for attribute values formed of alphanumeric strings. Alternatively or additionally, for some attributes such as manufacturer name, an equivalence dictionary may be consulted.

Alternatively or additionally to that described above, any other suitable methods known in the art for cleaning, normalizing and/or unifying attribute values may be used. It is noted that some of the tasks described here for the normalization (303) may be performed by crawler 204, instead of being performed by product matcher 106.

It is noted, however, that by aggregating attribute information on products for further processing from a plurality of web-sites, in accordance with embodiments of the present invention, product matcher 106 is made more robust, possibly compensating for noise in knowledge bases and attribute normalization methods.

Attribute Comparison

Referring in detail to comparing (316) the attributes of the description record 214 and the product record 204, the comparison optionally includes finding for the received description record 214, a product record 204 having same attribute values as the description record 214. Optionally, a match requires that at least a predetermined number and/or percentage and/or predetermined, system selected or user selected subset of the attributes of the description record 214 match the attributes of the product record 204 and no attribute values, or at most up to a predetermined number or subset of attribute values, are contradicting. In some embodiments of the invention, each attribute is associated with a positive weight indicating the chance that two products are the same if the values of the attribute for the products are the same. For example, a unique model number may have a very high positive weight, while product features have much lower positive weights.

Optionally, each attribute also has a negative weight, indicative of the chances that products are not the same if their value of the attribute does not match. Optionally, in comparing products, the positive weights of the matching attributes are added and the negative weights of the conflicting weights are subtracted. If the resulting sum is above a predetermined threshold a match is concluded. In some embodiments of the invention, only a minimal number of attributes which do not match are allowed, for example no more than one, allowing for finding matches even when there are small errors in product descriptions, but avoiding incorrect matches. Optionally, the negative weights are relatively high, such that a very high positive weight attribute match is required when there is an attribute mismatch, in order to conclude that two products match.

The weights are optionally preconfigured in list 116, based on known characteristics of the attributes. In some embodiments of the invention, the weights of an attribute are updated according to the number of matches of records 214 in which a match of the values of the attribute were confirmed or were not confirmed. Optionally, attributes which are not known to product matcher 106 are given an initial low weight or even a zero weight, which is increased if determined that matching records that have the attribute always have the same value of the attribute. Alternatively or additionally, a human operator may update the weight after a trial period, based on a report listing the matches in which the attribute was involved, i.e., both matched records had values for the attribute.

Alternatively to using a predetermined threshold, a human operator may set the threshold, for example through work station 140. In some embodiments of the invention, system 100 prepares matches for a plurality of different thresholds allowing the user to select which threshold to use for each task and/or at different times. Alternatively, a relatively low threshold is used and each match is assigned a confidence score. The user may select to use only matches having a confidence score above a desired threshold.

It is noted that in some embodiments, products differing only in minor attributes are considered belonging to a same product family. When matching products belonging to a single family, attributes which may be different between products of the family may be given a very small weight or even no weight at all. Attributes which may have different values for products in a same family may include, for example, color and condition (e.g., either new, refurbished or used).

Optionally, the link 210 between the records matched by ignoring one or more attributes, are marked with an indication of the attributes that were ignored. As discussed hereinbelow, in using database 108, the user may indicate which links are to be used and which are to be ignored. While a specific method of matching products was described above, other methods may be used in addition to, or instead of, the above described method. For example, any of the methods of comparing two products described in any of US patent publication 2008/0313165, U.S. Pat. Nos. 7,657,506, 6,961,721, 7,296,011, Winkler W E. "Overview of record linkage and current research directions", Statistical research division, US census Bureau, 2006 and Ahmed K. Elmagarmid, Panagiotis G. Ipeirotis, and Vassilios S. Verykios, Duplicate Record Detection: A Survey. *IEEE Trans. on Knowl. and Data Eng.* 19, 1 (January 2007), 1-16, the disclosures of which are incorporated herein by reference in their entirety, may be used.

In some embodiments of the invention, matcher 106 provides some or all of the matches to one or more human users for confirmation, such as through workstation 140 or a plurality of workstations. Optionally, the matches provided for confirmation are matches having a relatively low confidence score. In other embodiments, the matching is performed manually by the human user. In these embodiments, product matcher 106 optionally displays the attributes of the received record and of a list of similar records to the user and the user selects a matching record, if existent. This embodiment is optionally used with a relatively large number of human users participating in performing the matching. If desired, matches confirmed or entered by a specific user may be restricted for use only by that user, or in any other manner (e.g., to a group of users, only to users pay for at least a given service level). Possibly, matcher 106 provides confidence scores to human determined matches. Alternatively, the human performing the match provides the score. In some embodiments of the invention, matcher 106 provides a calculated and/or default score, possibly a plurality of suggested scores, and the human user is allowed to select one of the confidence scores or to enter his/her own score.

Database 108 may be organized in a manner which aids the comparison. For example, indexes of various attributes of records 204 and/or records 214 may be managed in database 108, to quickly find records which are possible matches.

Alternatively to comparing all attributes at once, with different weights, in some embodiments product matcher 106 first searches for product records 104 that have a unique attribute in common with the received record. If such a record is not found, product matcher 106 searches for records 104 having a common non-unique identifier and only if such a record 104 is not found, is an attempt to match using feature attributes performed.

In some embodiments of the invention, instead of including all attributes of linked description records 214 in attribute section 206 of aggregate record 206, searches for specific attributes are performed directly in all records 214, 222, for example using attribute indexes. When the attribute is found, product matcher 206 completes the comparison by checking all the records linked directly or indirectly to the record in which the specific attribute was found. In so doing, it traverses only links whose parameters match the current. In an embodiment over a relational database, the access to other records is performed using a SELECT command, using a JOIN operation, qualified by a WHERE clause defining the links not to be traversed.

Scheduling Comparison

As to scheduling (312) a comparison session of updated records 204 to the entire record list 202, in some embodiments of the invention, a comparison is scheduled for every addition or change of an attribute. Alternatively, a comparison session is scheduled only when an addition of an attribute is considered important, for example when the weight of the added attributes is above a predetermined threshold and/or at least a predetermined number of attributes were added.

Alternatively or additionally to scheduling comparison sessions responsive to changes, periodic comparison sessions for the entire list and/or for random records of the list are performed. Optionally, the same comparison method is used for comparing description records 214 and for comparing records 204 to each other.

When a match between two aggregate records 204 is found, one of the records is optionally linked to the other. Alternatively, the records 204 are merged and one of the records 204 is cancelled. Further alternatively, a new aggregate record is generated and the older records 204 are both linked to the new record. Optionally, if the match has a relatively low confidence score the products are not merged and are only linked to each other.

Link Parameters

In some embodiments of the invention the link usage parameters include restrictions on use of the link, which are imposed on the user according to his or her status. Alternatively or additionally, one or more of the link parameters are intended to allow the user using database 108 to select which links 210 are to be used, in each analysis query or session. Such link parameters may indicate a confidence of the match represented by the link 210, a price of using the link, and/or the attributes ignored in determining that the linked products are equivalent.

For example, a user providing information may be credited when the provided information and/or information derived at least partially using the provided information is used by another user. The other user is optionally provided the information only if willing to pay for it.

The link parameters imposed on the user may include, for example, an indication of a user identity or a company to which the link is restricted. For example, description records 214 may include trade secrets and therefore the information they include may be restricted only to the vendor that supplied the records. Alternatively or additionally, some of description records 214 may be collected from access restricted web-sites and only users subscribed to that web-site may be allowed to use the information is such records. Further alternatively or additionally, system 100 may receive information directly from the management of a web-site on condition that it be used only for some tasks and not for others, for example only for consumer price comparison and not for vendor market analysis.

Alternatively or additionally, a link may be restricted to users having at least a predetermined service level. Further alternatively or additionally, the link may be limited to use at specific times or may be open for use at different times according to the user's service level. For example, a low service level may limit some links to use only at night or at non-work hours. Another link limitation may indicate a time from upload of the record at which the link can be used by users belonging to other vendors than uploaded the data and/or by low service level users. For example, new information recently uploaded may be limited to high service level users, while old information, on the server for longer than a given period is available to all users. In some embodiments of the invention, a plurality of service levels are defined and each service level has a corresponding period from upload after which it may access initially restricted information. The restriction period may be a relatively short head start period, for example less than a week, e.g., more than 12 hours, more than 24 hours or even more than 48 hours, or may be a relatively long period of at least a month or even at least a year, making the allowed information suitable mainly for historical analysis and less, if at all, for current business information.

Other restrictions may include date and/or time slots in which specific records may be used.

Determining Parameters

As to determining (320) the link parameters, in some embodiments of the invention, the usage parameters of a link are based on usage parameters of the record 204 or 214 to which the link leads and/or on parameters of the match represented by the link 210. For example, if a record 214 is received with an indication that the record should be limited to specific users, this limitation is incorporated into the usage parameters of the link leading to the record.

The parameters of the match optionally include a match confidence score, which may be used at later times in determining the confidence of the link. Optionally, matches are given a score according to the weights of the attributes confirming the match. In some embodiments, the score of a match also depends on the confidence scores of the links to the records including the attributes that confirmed the match. The scores of the links to the records including the attributes that confirmed the match may also be used in determining matches. For example, the attribute weights may be multiplied by the score of the link to the record including the attribute, normalized to a value between 0 to 1, so that attributes which do not surely describe a product have lower chances of causing incorrect matches. It is noted that other methods of assigning a confidence score to links may be used, such as using cosine-similarity in a vector space model and/or Jaccard coefficients. Alternatively or additionally, the score assignment may use any of the methods described in Christopher D. Manning, Prabhakar Raghavan and Hinrich Schütze, *Introduction to Information Retrieval*, Cambridge University Press. 2008, the disclosure of which is incorporated herein by reference in its entirety. In some embodiments of the invention, a combination of a plurality different methods is used in assigning the scores.

In some embodiments of the invention, the match parameters include indication of attributes (e.g., year model, color) having different values in the matched records, which were ignored to confirm the match. For example, a link connecting matching products differing in color optionally is marked as being a match ignoring the color attribute. A user accessing the database may indicate whether links ignoring color should be used.

The usage parameters of a link 210 optionally incorporate the restrictions of the records whose attributes were used in creating the link and/or of the links that linked those records to each other. Alternatively, rather than completely preventing use of a link because it is at least partially based on data belonging to a specific user or vendor, the use of the link may be on condition that the user of the link pays for the use of the link. Thus, a vendor can be convinced to provide detailed product information including a plurality of attributes of products on the promise that users of the information will be charged for the use of the information and the provider of the information will be credited. In other embodiments, although access to a record 214 is limited, the limitation only applies to the parameter portion 216 and/or vendor parameters 226, and the attributes 236 of the product of the record 214 and the links resulting from their use do not assume the limitations of the records whose attributes were used in confirming the match.

In embodiments in which link restrictions propagate to matches determined using previous matches, when a match is found, the attributes used in confirming the match are optionally reviewed to determine which attributes belong to description records 214 associated with restrictions. The restrictions may be marked in the records and/or in the links 210 leading to them. Product matcher 106 optionally then determines whether the match could have been confirmed without the restricted attributes and if not, determines the status of the match responsive to the restrictions of the required attributes.

In determining whether the match could have been found without the restricted attributes, product matcher 106 optionally determines the weight sum of the non-restricted attributes and determines whether the sum of the weights of these attributes is sufficient to determine that the products match. If the sum of the weights of the non-restricted attributes is not sufficient, a group of attributes with the least restrictions, which is sufficient to warrant the match is selected and the restrictions of this group of attributes is associated with the match link. Alternatively or additionally, a plurality of different restrictions may be associated with the link, in the alternative.

In cases in which a match based on unrestricted attributes achieves a lower score than based on both restricted and unrestricted attributes, the match may be associated with both scores. Alternatively, for simplicity, a single score, for example the higher score, is assigned to the match.

Link usage parameters allow a plurality of different users to share a single database 108 and possibly controllably share information as desired. For example, two vendors may achieve an agreement of sharing information in which for each piece of information provided by Vendor A that is used by Vendor B, Vendor B is provided the right to a piece of information of Vendor A. Such an agreement may be over all provided information or only for some information, such as information on attributes.

In another example, a vendor informs system 100 that its product P0 matches specific products P1 and P2 of other vendors, but requests that this information on the nature of p0 not be supplied to other venders. It is noted that in some embodiments, the link between P1 and P2 is usable by users that are not entitled to use P0 and the links from P0 to P1 and P2. These users can enjoy the benefits of the knowledge that P1 and P2 relate to the same product, although they are not allowed to use the parameters and possibly the product attributes in P0 and the links from P0 to P1 and P2.

Competitive Product Analysis

Figure 4:
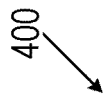
FIG. 4 is a schematic illustration of a product display, in accordance with an embodiment of the invention.

FIG. 4 is a schematic illustration of a product display 400 prepared by competitive product analysis unit 112, in accordance with an embodiment of the invention. Product display 400 optionally includes a plurality of sections which provide information on different aspects of a specific product. A price comparison section 402 optionally displays prices in various web sites and/or shops as appearing in product description records 214. Price comparison section 402 may further provide shipping costs and other price information, such as coupon information. A cost section 404 optionally displays information concerning the profitability of the product, such as cost to the vendor and expected margin. Together, sections 402 and 404 allow the viewer to quickly determine the profitability of the product, by comparing the cost to an expected sale price.

A product importance section 406 optionally provides information on the importance of the product. The importance information may be based on relevant business parameters from portions 216 of the records and/or on relevant proprietary vendor parameters 226. The importance information may optionally be based on web traffic information from traffic monitor 114 and/or on information collected from publically available web pages, such as the number of user reviews of the product. The importance information may be based on an estimate of the importance assigned to the product by other vendors, for example according to its location in categories on websites of other vendors. The importance information may also be based on proprietary information received from a vendor, such as results of consumer polls, web analytics of the vendor's website and/or sales of the product by the vendor.

A user feedback section 408 optionally presents feedback collected in web sites. The importance information may depend on geographical areas, vendors, or other parameters. In some embodiments of the invention, a proprietary information section 410 provides proprietary information on the product, such as current sales information, which for example may be taken from a vendor ERP system.

The side by side or otherwise combined provision of cost information with popularity information, allows the user to assess the profits for any particular product.

The information in each of the display sections may be provided in text, tables, graphs and/or drawings, optionally allowing the user to select the desired information and/or format. Using groups of records 214 from different time points, one or more of the sections may present information on changes over time and/or trends.

Analytical information may be provided in aggregate form for a set or sets of products, for instance, to compare trends across categories or manufacturers (each category or manufacturer corresponding to a set of products). A user may compare the prices of a set of products over a plurality of vendors, for example to see which vendors are more expensive and/or to try to analyze how different vendors set their prices. As another example, a user may compare price trends for a plurality of products in a single view (e.g., graph).

In some embodiments of the invention, competitive product analysis unit 112 presents to the user a search interface allowing the user to perform a multi-section search for products meeting specific conditions on both profitability (e.g., competitive prices, margins) and popularity (e.g., user searches, web-site traffic, feedback). Competitive product analysis unit 112 may provide information in many other forms, including analytical reports and interactive analytics. For example, a user may be able to request an interaction between trends of different product parameters, such as price changes vs. conversion (i.e., the ration of sales to visitors of a web page).

In some embodiments of the invention, competitive product analysis unit 112 provides suggestions for price optimization, such as products which can be given higher prices without substantially affecting their competitiveness and/or products following specific trends, such as having a growing importance measure. Analysis unit 112 may also provide indications of products that are not worth handling due to low margins and/or client interest. In some embodiments of the invention, competitive product analysis unit 112 is configured to provide alerts when specific conditions occur. Product database 108 may be accessed manually by a human user or may be accessed by automatic software. In some embodiments, competitive product analysis unit 112 automatically controls prices of products.

Optionally, competitive product analysis unit 112 is configured to provide information and/or suggestions on managing product marketing and/or advertising. The information may be used, for example, to determine which products are worth spending marketing resources. As mentioned above, each access to database 108 depends on the parameters of the access, such that different accesses may receive different results, based on a different view of the database depending on the links the access is allowed to use and/or selects to use.

In some embodiments of the invention, competitive product analysis unit 112 is configured to provide suggestions on inventory management based on the importance of the products and/or their price margins. Database 108 optionally also includes for some products vendor inventory information. This information may be used by analysis unit 112 in providing suggestions on setting prices, ordering products and/or marketing initiatives.

Analysis unit 112 may provide information based on current information and/or may provide information based on trends over time of prices and/or any other business parameters. For example, the information over times may be used to determine the effect of price changes on sales in various products.

In some embodiments of the invention, an importance assessor 138 uses the information in product database 108 to find important or popular products, based on user feedback, webpage traffic and keyword searches. The importance is optionally determined using a plurality of different parameters, such as:

a) placement of the product on other websites;
b) web traffic to the product's page;
c) website user provided ratings, including the number of ratings and/or their content (e.g., like/dislike);
d) user provided reviews, including the number of reviews and their content, for example as analyzed by a text mining program;
e) searches for the product on specific sites and/or general search engines, in specific unique; and
f) presence of the product in data feeds and comparison shopping engines;
g) extent of advertisement of the product.

Optionally, importance assessor 138 points out trends in importance, such as products having an increasing popularity in specific regions. In some embodiments, importance assessor 138 receives demographic information on regions for which there is available popularity information and presents the information when pointing out regions in which products are popular.

The importance of products may be assessed globally or may be assessed for specific regions, manufacturers, vendors and/or web-sites. Importance assessor may provide the user a list of most important products or such a list may be used by competitive product analysis unit 112 to determine products achieving a desired balance of popularity and profitability.

In some embodiments of the invention, importance assessor 138 assigns importance scores to products in database 108. The scores are optionally stored in aggregate product records 204. The importance score is optionally a numerical importance score on a single dimension scale, which summarizes the importance information on the product. For example, the importance score may be determined as a weighted sum of respective scores given based on some or all of the above mentioned importance parameters.

Alternatively or additionally, competitive product analysis unit 112 assigns a combined popularity-profitability score to the products in database 108. Optionally, the user can select the relative weights given to the popularity and to the profitability in the combined score and/or the relative weights of the components of each of the scores.

CONCLUSION

While specific internal database structures have been described, those skilled in the art will appreciate that other database structures designed using various software and hardware tools may be used to implement embodiments of the present invention. For example, some of the lists described above may be formed of a plurality of sub-tables for convenience. FIGS. 5A and 5B are together a schematic illustration of a few records of a main table of database 108, in accordance with a possible embodiment of the invention.

In some embodiments, database 108 is managed as a standard relational database. In other embodiments, a non-relational database is used or a data system other than a database management system is used.

It is noted that the term product used herein is meant to encompass entities sold to customers, whether end-consumers, manufacturers or retailers, including tangible goods, services, rental or rights.

It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method of managing information on products, comprising:

providing a database of product records comprising values of product attributes, each product record including for a respective product, values for a sub-group of attributes, which is independent of the attributes for which other product records have values;

storing, in the database, links between records found to at least possibly relate to a same single product, wherein at least some of the links are marked with restrictions on the use of the links;

receiving an input product record and a database access parameter, by a processor;

comparing the received input product record to product records of the database, by the processor, by assigning comparison scores to attributes for which both the compared records have values and calculating a combined comparison score as a function of the attribute comparison scores; and outputting information from a product record found to match the input product record with a combined comparison score above a threshold, wherein the comparing comprises comparing the received input product record to product records linked by links marked with restrictions that are met by the received database access parameter, as if the attributes of the linked product records all relate to a single product, and comparing the received input product record separately to each product record on its own, for product records linked by links marked with restrictions that are not met by the received database access parameter.

2. The method of claim 1, wherein comparing the received input product record to linked product records, as if the attributes of the linked product records all relate to a single product comprises assigning comparison scores to one or more attributes for which the input product record and a first one of the linked product records have values, but a second one of the linked records does not have a value, and to one or more attributes for which the input product record and the second one of the linked product records have values, but the first one of the linked records does not have a value, and calculating a combined comparison score for the linked product records, as a function of the attribute comparison scores.

3. The method of claim 1, wherein at least some of the links are marked with restrictions on users that are allowed to use the links and wherein the database access parameter includes an identity of the user for which the comparing is performed.

4. The method of claim 1, wherein at least some of the links are marked with restrictions on times at which the links may be used.

5. The method of claim 1, wherein at least some of the links are marked with a price requested for usage of the link.

6. The method of claim 1, wherein at least some of the links are marked with a confidence of the link and wherein the database access parameter includes a requested confidence level to be used in comparing the received input product record to product records of the database.

7. The method of claim 1, comprising storing a link between the input product record and the plurality of linked product records, if the combined comparison score of their comparison is above a predetermined confidence level.

8. The method of claim 7, wherein storing the link comprises storing the link with the respective combined comparison score.

9. A product matching system, comprising:
an input interface configured to receive, from outside the product matching system, product records comprising values of one or more respective attributes, each product record including for a respective single product, values for a sub-group of attributes, which is independent of the attributes for which other product records have values, and to receive a database access parameter;
a memory configured to store a database of the product records received by the input interface, and links between product records in the database, wherein linked product records possibly relate to a same product and at least some of the links are marked with restrictions on the use of the links;
a processing unit adapted to compare product records received through the input interface to product records in the database, by comparing values of attributes for which both the compared product records have values, and to store in the memory, links of compared records representing a respective single product found in a comparison to relate to a same single product with at least a predetermined confidence level; and
an output interface configured to provide information from records found to match input through the input interface,
wherein the processing unit is adapted to compare the product records received through the input interface to product records linked by links marked with restrictions that are met by the received database access parameter, as if the attributes of the linked product records all relate to a single product, and to compare the product records received through the input interface separately to each product record on its own, for product records linked by links marked with restrictions that are not met by the received database access parameter.

10. The system of claim 9, wherein the processing unit is configured to store linked records separately in the database.

11. The system of claim 9, wherein the processing unit assigns a matching score to the match of the input product record to the given product, according to a confidence that the input product record describes the given product.

12. The system of claim 11, wherein the matching score assigned by the processing unit is a function of a matching score of the plurality of linked records to which the input record was found to match.

13. The system of claim 11, wherein the processing unit is configured to receive a user defined level and to provide information on a product corresponding to a first product record in the database, using information from the first product record and from product records matching the first product record with a matching score above the received user defined level.

14. The system of claim 11, wherein each of the attributes is assigned a weight and the processing unit calculates, in comparing records, a match score as a sum of the weights of the attributes which have same values.

15. The system of claim 9, wherein the processing unit is configured to determine for received product records an importance score based on a plurality of different measures on the importance of the product in the eyes of customers or vendors.

16. The system of claim 9, wherein the output interface is configured to display for products in the database a price comparison of the product from a plurality of vendors, along with proprietary information of a specific vendor, which is displayed only to users authorized by the specific vendor and not to other users.

17. The system of claim 16, comprising an output interface configured to display for products in the database a price comparison of the product from a plurality of vendors, along with at least one measure indicative of the cost of the product to the specific vendor.

18. The system of claim 9, wherein the memory is configured to store with the links, respective ownership indications, which indicate for which users the respective link may be taken into consideration.

19. The system of claim 9, wherein at least some of the links are marked with a confidence of the link and wherein the database access parameter includes a requested confidence level to be used in comparing the received input product record to product records of the database.

20. A computer software product, comprising a tangible non-transitory computer-readable medium in which program instructions are stored, which instructions, when read by a computer, cause the computer to:
access a database of product records comprising values of product attributes, each product record including for a respective single product, values for a sub-group of attributes, which is independent of the attributes for which other product records have values, and links between records found in a comparison to at least possibly relate to a same single product, wherein at least some of the links are marked with restrictions on the use of the links;
receiving an input product record and a database access parameter;

comparing the received input product record to product records of the database, by the processor, by assigning comparison scores to attributes for which both the compared records have values and calculating a combined comparison score as a function of the attribute comparison scores; and outputting information from a product record found to match the input product record with a combined comparison score above a threshold, wherein the comparing comprises comparing the received input product record to product records linked by links marked with restrictions that are met by the received database access parameter, as if the attributes of the linked product records all relate to a single product, and comparing the received input product record separately to each product record on its own, for product records linked by links marked with restrictions that are not met by the received database access parameter.

* * * * *